(12) United States Patent
Gosda

(10) Patent No.: US 6,367,591 B1
(45) Date of Patent: Apr. 9, 2002

(54) AUTOMATIC BRAKE CLEARANCE ADJUSTER

(75) Inventor: Robert L. Gosda, Plano, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/468,472

(22) Filed: Dec. 21, 1999

(51) Int. Cl.$^7$ .............................................. F16D 55/02
(52) U.S. Cl. ............... 188/71.8; 188/196 R; 188/196 P
(58) Field of Search .............................. 188/71.7, 71.8, 188/196 V, 196 B, 196 P, 196 R, 72.3, 71.5; 192/111 A

(56) References Cited

U.S. PATENT DOCUMENTS

| | | | |
|---|---|---|---|
| 2,568,858 A | | 9/1951 | Kovac |
| 2,788,095 A | * | 4/1957 | Brooks .................... 188/196 B |
| 2,900,052 A | | 8/1959 | Frayer et al. ............ 188/196 P |
| 2,945,396 A | | 7/1960 | Stultz, Jr. |
| 3,194,350 A | * | 7/1965 | Soltis ...................... 188/196 P |
| 3,403,754 A | * | 10/1968 | Barrett et al. ............ 188/196 P |
| 3,517,785 A | | 6/1970 | Cunningham ........... 188/196 B |
| 3,554,336 A | | 1/1971 | Crossman .................. 188/71.8 |
| 3,575,268 A | | 4/1971 | Kimata ....................... 188/71.8 |
| 3,618,714 A | * | 11/1971 | Croswell ................ 188/196 P |
| 3,952,840 A | * | 4/1976 | Yamazaki et al. .......... 188/71.8 |
| 4,016,959 A | | 4/1977 | Menard et al. |
| 4,466,524 A | * | 8/1984 | Lane ........................ 192/111 A |
| 4,478,316 A | | 10/1984 | Davidson |
| 4,887,696 A | * | 12/1989 | Redenbarger et al. ..... 188/71.8 |
| 5,050,710 A | | 9/1991 | Bargfrede |
| 5,386,887 A | | 2/1995 | Hilgert et al. .......... 188/196 B |
| 5,497,859 A | | 3/1996 | Nowosielski ........... 188/196 B |
| 5,601,160 A | | 2/1997 | Horsch ....................... 188/71.5 |
| 5,607,033 A | | 3/1997 | Naedler et al. |
| 5,628,387 A | | 5/1997 | Schantzen |
| 5,664,646 A | | 9/1997 | Bejot et al. |
| 5,709,287 A | | 1/1998 | Bochman |

* cited by examiner

Primary Examiner—Douglas C. Butler
Assistant Examiner—Thomas J. Williams
(74) Attorney, Agent, or Firm—Haverstock, Garrett & Roberts; Liza J. Meyers

(57) ABSTRACT

The present automatic clearance adjuster mechanism maintains a predetermined maximum brake clearance regardless of the wear condition of the brake. The brake includes a longitudinally extending rod mounted to the brake housing external to the piston element. The present automatic clearance adjuster mechanism includes a sleeve element disposed about the rod, and a biasing element disposed for releasably holding the sleeve element against the rod for preventing movement thereof along the rod to limit the retraction of the piston element to a predetermined distance relative to the sleeve element. The present mechanism also includes a release element disposed to release the biasing element when the piston element is moved in a first or extend direction to allow the sleeve element to be moved by the piston element to an advanced position along the rod and allow the biasing element to hold the sleeve element against the rod in the advanced position when the movement in the extend direction is stopped or the piston element is moved in the opposite direction, the sleeve element when held against the rod in the advanced position limiting the retraction of the piston element to a predetermined distance relative to the advanced position.

12 Claims, 5 Drawing Sheets

Fig-4-
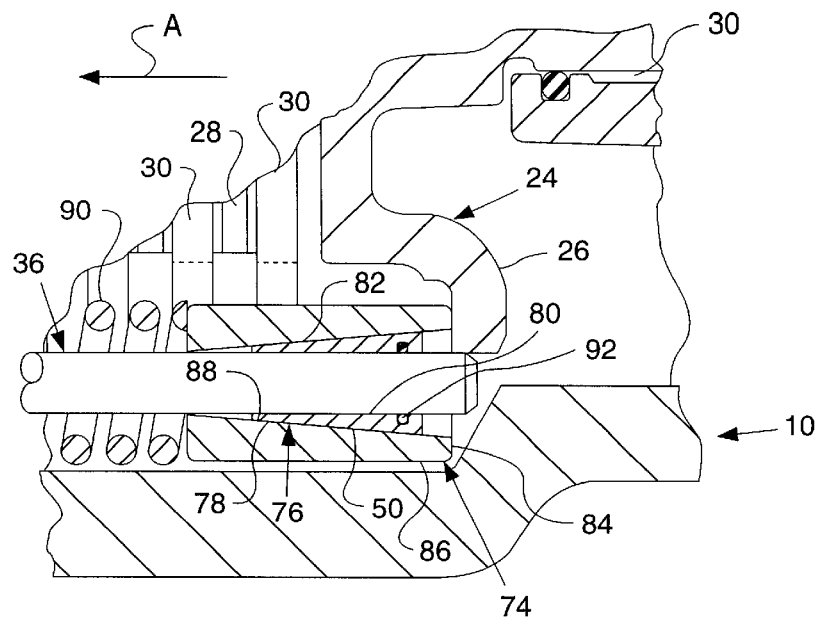
Fig-7-
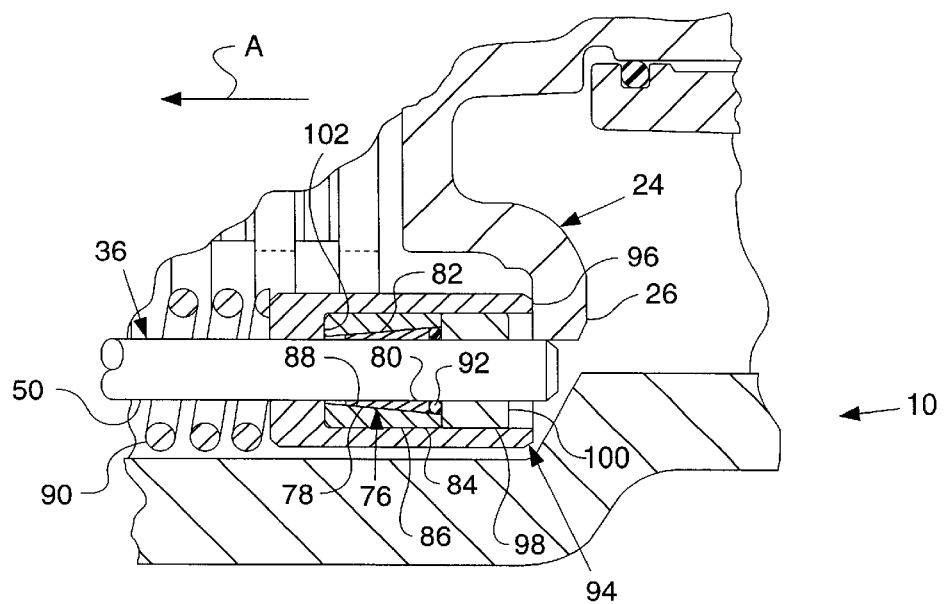

AUTOMATIC BRAKE CLEARANCE ADJUSTER

TECHNICAL FIELD

This invention relates generally to a brake clearance adjuster for a vehicle such as a work machine, off-highway truck, or the like, and more particularly, to a brake clearance adjuster for automatically maintaining a predetermined maximum brake clearance regardless of the wear condition of the brake.

BACKGROUND ART

Currently, a wide variety of devices for adjusting the clearance or slack between rotors and frictional elements of brake mechanisms are well known. Reference, for instance, Kovac U.S. Pat. No. 2,568,858, issued Sep. 25, 1951; Frayer et al. U.S. Pat. No. 2,900,052 issued Aug. 18, 1959 to the Goodyear Tire & Rubber Company; Crossman U.S. Pat. No. 3,554,336 issued Jan. 12, 1971 to the Goodyear Tire & Rubber Company; Cunningham U.S. Pat. No. 3,517,785 issued Jun. 30, 1970 to the Bendix Corporation; Kimata U.S. Pat. No. 3,575,268 issued Apr. 20, 1971 to Isuzu Motors Limited; Davidson U.S. Pat. No. 4,478,316 issued Oct. 23, 1984; Nowosielski U.S. Pat. No. 5,497,859 issued Mar. 12, 1996; and Naedler et al. U.S. Pat. No. 5,607,033 issued Mar. 4, 1997 to Mark+2 Technologies, Inc.

However, the known clearance adjuster devices suffer from various shortcomings and limitations, for instance, complexity and cost disadvantages. In particular, numerous of the known devices are located within the piston element of the brake mechanism so as to add substantial complexity and cost to the piston element. This also makes access to the adjuster mechanism difficult for performing maintenance and service. Additionally, several of the known adjuster devices bear or transmit at least a portion of the braking force, increasing the design requirements thereof. Further, several of the known devices only allow relatively large increments of advancement of the piston element as the frictional elements of the brake wear compared to the amount of clearance or slack provided, such that the maximum allowed slack is substantially greater when the brakes are worn compared to when new.

Accordingly, the present invention is directed to overcoming one or more of the problems as set forth above.

DISCLOSURE OF THE INVENTION

According to one aspect of the invention, an automatic clearance adjuster mechanism which maintains a predetermined maximum brake clearance for a brake for retarding rotation of a rotatable member about a longitudinal axis is disclosed. The brake includes a brake housing having a fluid receiving chamber and a piston element disposed partially within the fluid receiving chamber. The piston element is movable by pressurized fluid in the chamber longitudinally in a first or extend direction outwardly with respect to the fluid receiving chamber for applying a pressure for retarding the rotation of the rotatable member, and in an opposite retract direction to provide clearance for freer rotation of the rotatable member. The brake also includes a longitudinally extending rod mounted to the brake housing external to the piston element. The present automatic clearance adjuster mechanism includes a sleeve element disposed about the rod, and a biasing element disposed for releasably holding the sleeve element against the rod for preventing movement thereof along the rod to limit the retraction of the piston element to a predetermined distance relative to the sleeve element. The present mechanism also includes a release element disposed to release the biasing element when the piston element is moved in the first or extend direction to allow the sleeve element to be moved by the piston element to an advanced position along the rod and allow the biasing element to hold the sleeve element against the rod in the advanced position when the movement in the extend direction is stopped or the piston element is moved in the opposite direction, the sleeve element when held against the rod in the advanced position limiting the retraction of the piston element to a predetermined distance relative to the advanced position.

According to a preferred aspect of the invention, the sleeve element includes a split sleeve, the biasing element includes at least one retainer ring disposed around the split sleeve, and the release element comprises cooperatively engageable serrated portions on the split sleeve and on the rod which allow movement of the split sleeve along the rod in the first or extend direction.

According to another preferred aspect of the present invention, the sleeve element includes a split sleeve having a longitudinally tapered outer surface, and the biasing element includes a bushing disposed around the split sleeve and having a longitudinally tapered inner surface positioned for slidable engagement with the tapered outer surface for compressing the split sleeve to hold the split sleeve around the rod when the piston element is retracted, and a compression spring disposed for retracting the piston element and urging the tapered surfaces into the slidable engagement.

BRIEF DESCRIPTION OF THE DRAWINGS

FIG. 4 is a fragmentary cross-sectional view of the disc brake of FIG. 1 including another automatic clearance adjuster mechanism according to the present invention;

FIG. 7 is a fragmentary cross-sectional view of the brake of FIGS. 1 and 4 including still another automatic clearance adjuster mechanism of the present invention.

BEST MODE FOR CARRYING OUT THE INVENTION

Figure 1:
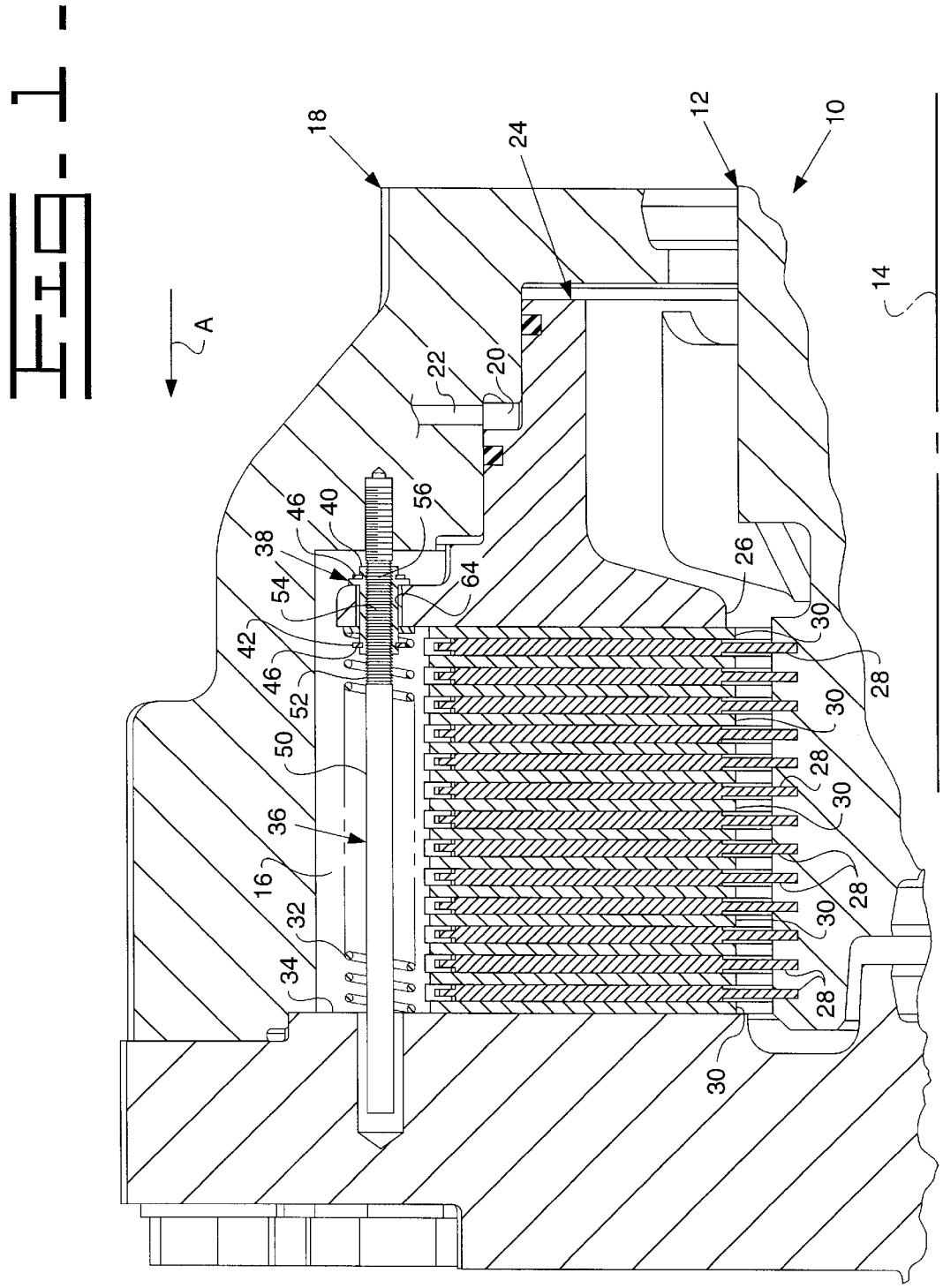
FIG. 1 is a fragmentary cross-sectional view of a typical prior art wet disc brake for retarding rotation of a rotatable member, including an automatic clearance adjuster mechanism according to the present invention.

Referring now to the drawings, FIG. 1 shows a typical prior art wet disc or oil dipped disc brake 10 for a vehicle such as a work machine (not shown) such as, but not limited to, a crawler, bulldozer, earthmoving machine, off-highway truck, or the like, including a rotatable member 12 which can be a hub, shaft or the like for a wheel of the machine, rotatable about a longitudinal axis 14 within a cavity 16 of a brake housing 18. Brake housing 18 includes a fluid receiving chamber 20 connected via a fluid conduit 22 to a fluid source (not shown) in the conventional manner for receiving pressurized fluid therefrom, and a piston element 24 disposed partially within fluid receiving chamber 20. Brake 10 is modulated or applied by introducing pressurized fluid into fluid receiving chamber 20 to move piston applying a pressure for retarding the rotation of rotatable member 12. When modulation is ceased or reduced, piston element 24 is applying a pressure for retarding the rotation of rotatable member 12. When modulation is ceased or reduced, piston element 24 is retractable in an opposite second or retract direction to provide clearance for rotation of rotatable member 12 by a spring 32.

Piston element 24 includes a pressure plate 26 located in cavity 16 in opposing relation to a plurality of concentric, axially spaced annular rotors 28 mounted to rotatable member 12 for rotation therewith, a plurality of annular frictional elements 30 being supported by brake housing 18 in the spaces between rotors 28, respectively, the pressure applied by piston element 24 operating to compressively urge or press rotors 28 and frictional elements 30 together for retarding the rotation of rotatable member 12 in the well known manner. Cavity 16 of brake 10 is typically at least partially filled with a liquid such as an oil (not shown) for cooling rotors 28 and frictional elements 30 during and after the braking action.

Figure 2:
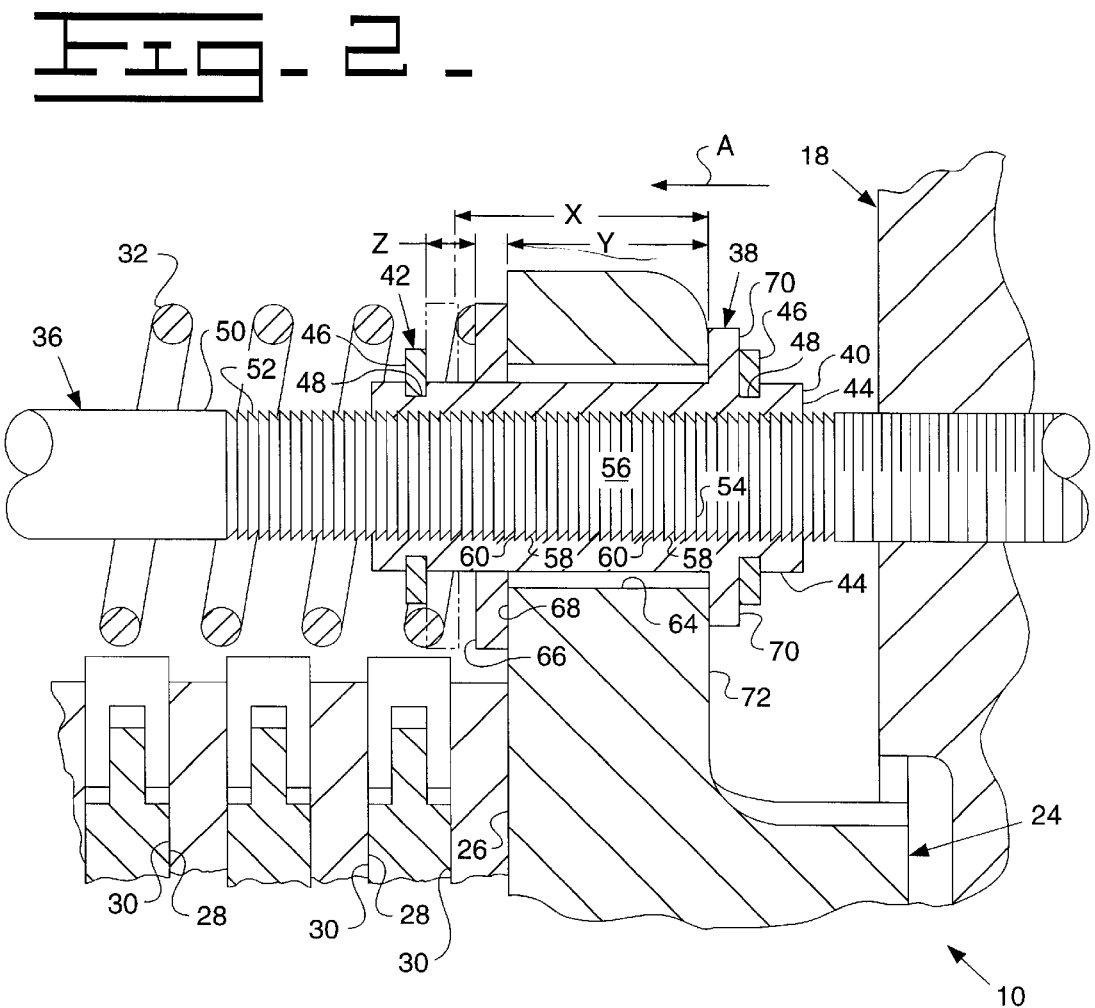
FIG. 2 is an enlarged fragmentary cross-sectional view of the brake of FIG. 1 and the present automatic clearance adjuster mechanism.

Brake 10 includes at least one spring 32 for retracting piston element 24 when the pressure of the pressurized fluid in fluid receiving chamber 20 is reduced or relieved. Each spring 32 is preferably disposed around an elongate, longitudinally extending rod 36 and extends between a surface 34 of housing 18 and a flange 66 engageable with pressure plate 26 of piston element 24, as shown in FIG. 2. Each rod 36 is fixedly mounted to housing 18 external to piston element 24, rod or rods 36 serving to guide or align the longitudinal movement of piston element 24 and prevent rotation thereof relative to brake housing 18 and fluid receiving chamber 20.

Figure 3:
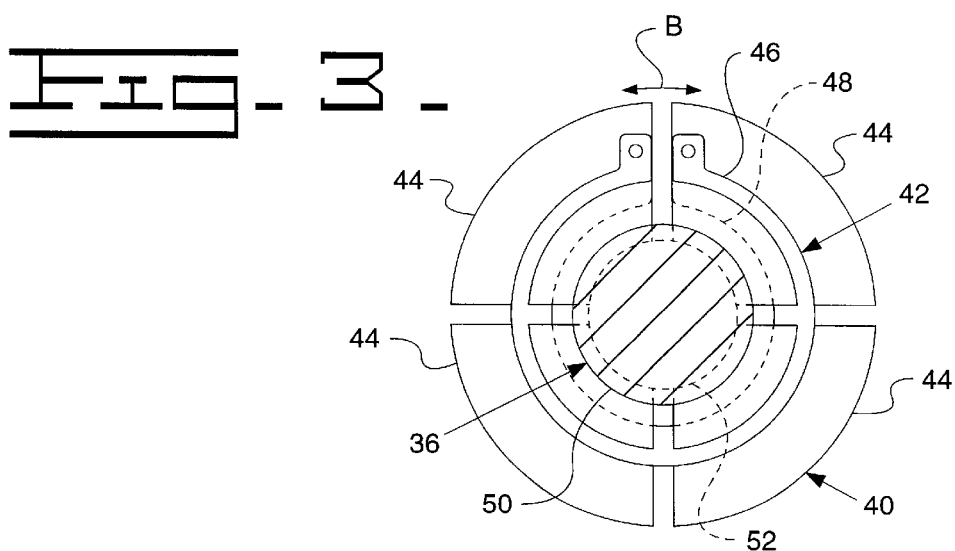
FIG. 3 is an end view of the automatic clearance adjuster mechanism of FIGS. 1 and 2.

Referring also to FIGS. 2 and 3, the present invention resides in an automatic clearance adjuster mechanism 38, mechanism 38 being automatically operable for controlling or maintaining a constant maximum distance of retraction of piston element 24 as frictional elements 30 and/or rotors 28 become worn or thin over time. Mechanism 38 includes a sleeve element 40 disposed about rod 36, and a biasing element 42 disposed for releasably holding sleeve element 40 against rod 36 for preventing movement of sleeve element 40 along rod 36 for limiting retraction of piston element 24, as will be explained.

Sleeve element 40 is of multiple piece construction including a plurality of sleeve segments 44, biasing element 42 including a pair of retainer rings 46 disposed in annular grooves 48 of sleeve segments 44 adjacent opposite longitudinal ends thereof. Rod 36 has an external surface 50 including a longitudinally extending external serrated portion 52, and sleeve segments 44 of sleeve element 40 include internal surfaces 54 each including a longitudinally extending internal serrated portion 56 located in opposed relation to external serrated portion 52 of rod 36. Retainer rings 46 are made from a resilient spring material such as spring steel, and are operable to yieldably urge sleeve segments 44 against rod 36 to matingly engage serrated portions 52 and 56 for preventing longitudinal movement of sleeve segments 44 along rod 36. Serrated portions 52 and 56 include individual serrations which include mating surfaces 58 that taper outwardly toward the first or extend direction, and adjacent mating surfaces 60 which are longitudinally facing, such that when sleeve segments 44 of sleeve element 40 are urged longitudinally in the second or retract direction, the mating surfaces 60 prevent relative longitudinal movement of sleeve element 40 along rod 36. However, when sleeve element 40 is urged in the first or extend direction (arrow A), mating surfaces 58 function as a release element 62 to force or spread the open ends of retainer rings 46 apart (arrow B, FIG. 3) sufficiently to allow sleeve segments 44 of sleeve element 40 to collectively advance along rod 36 in the first or extend direction. To provide the necessary force for spreading retainer rings 46 apart, sleeve element 40 is located in a hole 64 through pressure plate 26 of piston element 24 and an annular flange 66 is disposed around a longitudinal end of sleeve element 40 and maintained in position by spring 32 such that when piston element 24 is moved in the first or extend direction by modulation or application of brake 10, an edge 68 of pressure plate 26 around hole 64 will urge flange 66 longitudinally against the retainer ring 46 as shown in phantom. As a result, the retainer ring 46 exerts a force against the sleeve segments 44 to effect a sliding action between tapered surfaces 58 to drive sleeve segments 44 outwardly in opposition to retainer rings 46 such that the retainer rings 46 yield to allow surfaces 58 to disengage to advance sleeve element 40 along rod 36. Sleeve element 40 will be advanced along rod 36 in this manner until sleeve element 40 reaches an advanced position along rod 36 corresponding to the distance traveled by piston element 24 in the first or extend direction. Over time, piston element 24 will move farther in the first or extend direction as rotors 28 and/or frictional elements 30 wear and become thinner, sleeve element 40 being advanced along rod 36 correspondingly in the above-described manner by the piston element to new advanced positions.

When modulation of brake 10 is ceased, it is desirous for piston element 24 to be moved in the second or retract direction to allow freer rotation of rotatable member 12, piston retraction spring or springs 32 or other suitable means being provided for this purpose. However, it is also desirable that the distance that piston element 24 must travel to engage frictional elements 30 with rotor 28 be reasonably short, such that the braking action occurs soon after the brake is applied. To limit the distance that piston element 24 can be moved in the second or retract direction, sleeve segments 44 of sleeve element 40 include flange segments 70 adjacent a longitudinal end of sleeve element 40 opposite flange 66 in position for engagement with an edge 72 of pressure plate 26 around hole 64. Flange segments 70 are located a predetermined distance X from flange 66 when the brake is modulated (shown in phantom), distance X being greater than a thickness Y of pressure plate 26 as measured between edges 68 and 72, and piston element 24 is retractable a maximum distance Z. Regardless of the location of sleeve element 40 along rod 36, the distance Z is constant such that the maximum retraction of piston element 24 will be the same.

Figure 5:
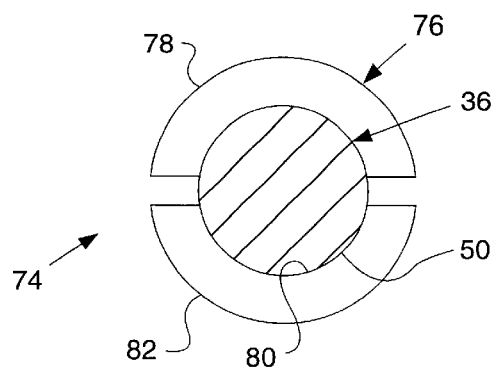
FIG. 5 is an end view of a sleeve element of the mechanism of FIG. 4 around a rod of the brake.
Figure 6:
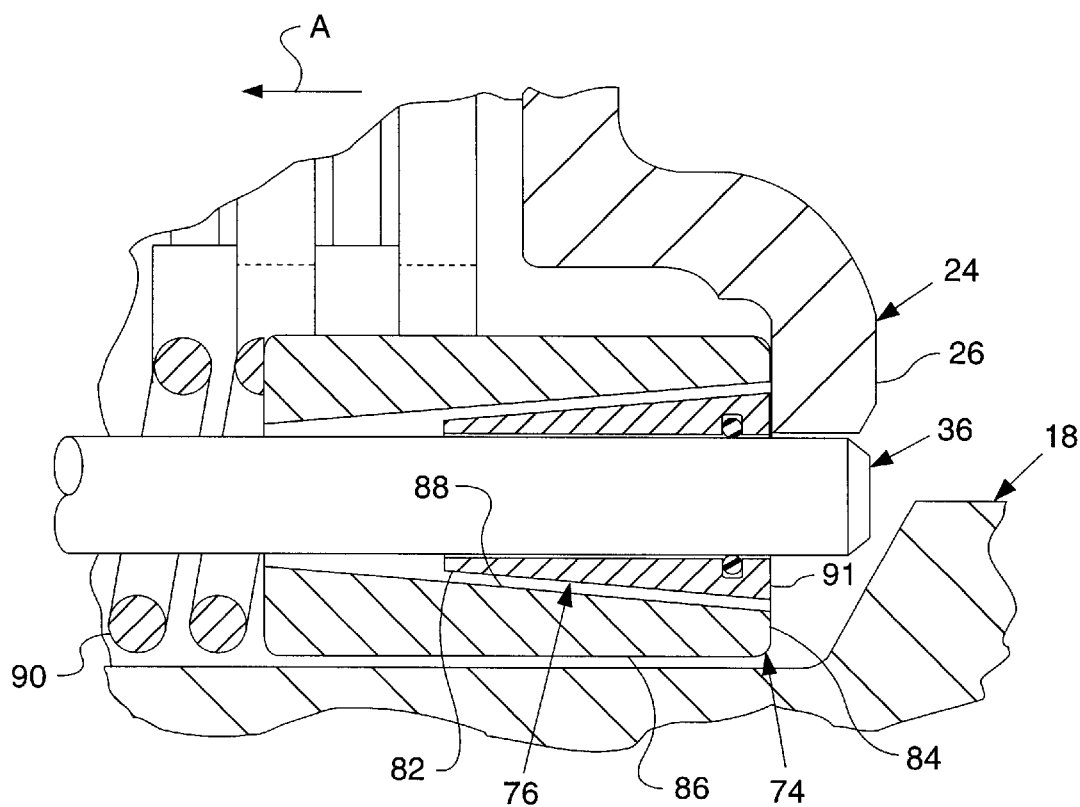
FIG. 6 is an enlarged fragmentary view of the mechanism of FIG. 4 in an operative mode for advancing the sleeve element along the rod.

Referring to FIGS. 4, 5 and 6, a brake 10 is shown including another automatic clearance adjuster mechanism 74 constructed and operable according to the teachings of the present invention, like parts of mechanism 74 and mechanism 38 being identified by like numbers. Brake 10 includes a rod 36 fixedly mounted to a brake housing 18, and a piston element 24 longitudinally movable in a first or extend direction, as denoted by the arrow A, by pressurized fluid in a fluid receiving chamber 20 when brake 10 is modulated or actuated. Piston element 24 includes a pressure plate 26 urgable against a plurality of alternating rotors 28 and frictional elements 30 for retarding or stopping rotation of a rotatable member 12 (FIG. 1) to which rotors 28 are mounted as explained above.

Mechanism 74 includes a sleeve element 76 disposed about rod 36 including a multiple piece split sleeve 78 which extends at least partially around rod 36, split sleeve 78 having an inner circumferential surface 80 in opposed relation to external surface 50 of rod 36, surfaces 80 and 50 both being smooth. Split sleeve 78 has an outer circumferential surface 82 which is longitudinally tapered convergingly in the first or extend direction, as denoted by arrow A. Mechanism 74 includes a biasing element 84 including a bushing 86 disposed around split sleeve 78 having an inner circumferential surface 88 located in opposed relation to outer circumferential surface 82 of split sleeve 78 so as to be longitudinally slidable into engagement therewith, and a compression coil spring 90 disposed around rod 36 between bushing 86 and a fixed portion of brake housing 18 (not shown). Spring 90 is operable for retracting piston element 24 by urging bushing 84 longitudinally thereagainst, and at the same time is operable to slidably engage surfaces 82 and 88 so as to compress or squeeze element 76 against or around rod 36 sufficiently such that frictional forces between surface 80 of split sleeve 78 and surface 50 of rod 36 are great enough to prevent longitudinal movement of split sleeve 78 in the second or retract direction (opposite arrow A). A ring 92 preferably of a metal material is located in a groove around surface 80 in position to prevent or reduce longitudinal movement of split sleeve 78 along rod 36 to allow the bushing to overtake and engage the split sleeve. When surfaces 82 and 88 are fully slidably engaged, as shown, bushing 86 is also effectively immobilized so as to stop further retraction of piston element 24 via bushing 86.

Referring more particularly to FIG. 6, bushing 86 has a longitudinal extent greater than the longitudinal extent of sleeve element 76 such that when brake 10 is modulated or actuated so as to move piston element 24 in the first or extend direction in opposition to spring 90, bushing 86 is moved in the same direction so as to operate as a release element 91 to disengage surfaces 82 and 86 such that sleeve element 76 is no longer held against rod 36, as shown. When piston element 24 is moved a predetermined distance in the first or extend direction, pressure plate 26 will engage sleeve element 76 and move or advance it in the same direction to an advanced longitudinal position along rod 36. Then, when the modulation or actuation of brake 10 is reduced or ceased, spring 90 can again move bushing 86 in the second or retract direction so as to slidably engage surfaces 82 and 88 thereby holding sleeve element 76 against rod 36 in the advanced position while moving piston element 24 in the second or retract direction, the retraction halting when bushing 86 has moved so as to fully engage sleeve element 76, thereby limiting retraction of piston element 24 relative to the advanced position. As noted above, as brake 10 is used, rotors 28 and/or frictional elements 30 will wear, such that sleeve element 76 will be moved to new advanced positions along rod 36, the maximum distance of retraction of piston element 24 being predetermined relative to the last advanced position of sleeve element 76.

Figure 8:
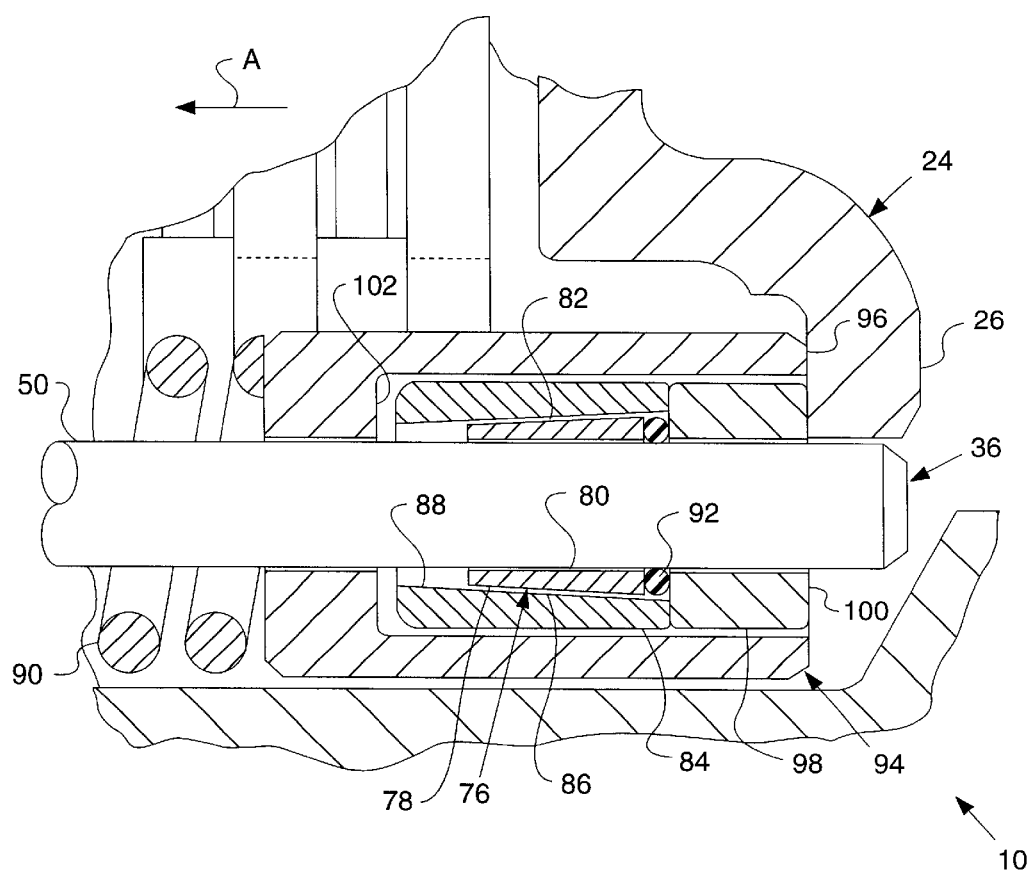
FIG. 8 is an enlarged fragmentary cross-sectional view of the brake and mechanism of FIG. 7 in an operating mode for advancement of a sleeve element thereof.

Turning to FIGS. 7 and 8, brake 10 is shown including another automatic clearance adjuster mechanism 94 constructed and operable according to the teachings of the present invention, like parts of mechanism 94 and mechanisms 38 and 74 being identified by like numbers. Like mechanism 74, mechanism 94 includes a sleeve element 76 disposed about rod 36 of brake 10, sleeve element 76 including a split sleeve 78 having an inner circumferential surface 80 located in opposing relation to external surface 50 of rod 36, both surfaces 50 and 80 being smooth. Split sleeve 78 has an outer circumferential surface 82 which is tapered so as to extend convergingly in the first or extend direction denoted by arrow A, mechanism 94 including a biasing element 84 which includes a bushing 86 having an inner circumferential surface 88 which is correspondingly tapered so as to converge in the direction A, surfaces 82 and 88 being slidable engageable in the above-described manner. Biasing element 84 includes a compression coil spring 90 disposed around rod 36, but instead of bearing directly against bushing 86, spring 90 bears against a longitudinal end of an outer sleeve 96 disposed around bushing 86, the opposite longitudinal end of outer sleeve 96 being disposed for contact with pressure plate 26 of piston element 24. Mechanism 94 additionally includes a release element 98 including a release sleeve 100 disposed around rod 36 between bushing 86 and pressure plate 26 of piston element 24, and a ring 92 disposed around rod 36 intermediate split sleeve 78 and release sleeve 100.

Referring more particularly to FIG. 8, when brake 10 is modulated or actuated so as to move piston element 24 in the first or extend direction, pressure plate 26 bears against outer sleeve 96 so as to urge outer sleeve 96 against spring 90 to compress spring 90 and open a longitudinal space between bushing 86 and an enclosed end 102 of outer sleeve 96. When outer sleeve 96 is moved a predetermined distance, pressure plate 26 engages release sleeve 100 to push or urge bushing 86 into the space and out of engagement with split sleeve 78 such that split sleeve 78 is no longer held against rod 36 and can be advanced along rod 36 by piston element 24 via ring 92.

Referring back to FIG. 7, when modulation or actuation of brake 10 is ceased, spring 90 is operable to move piston element 24 in the second or retract direction via outer sleeve 96, movement of outer sleeve 96 a predetermined distance in the second or retract direction engaging enclosed end 102 with bushing 86 to again slidably engage surfaces 82 and 88 for holding sleeve element 76 against rod 36 thereby immobilizing split sleeve 78, bushing 86, outer sleeve 96 and spring 90 so as to limit the distance of retraction of piston element 24 relative to split sleeve 78 in the advanced position.

INDUSTRIAL APPLICABILITY

The present automatic clearance adjuster mechanism has utility for a wide variety of brake applications in addition to wet disc brake 10 shown. The present adjuster mechanisms provide a simple inexpensive means for providing a uniform brake clearance, regardless of the wear condition of the rotors and frictional elements of the brake. Additionally, the present mechanisms do not carry or transmit the braking effort, and the location of the present clearance adjuster mechanisms external to the piston provide easy and simple access for maintenance and service. When the brake housing is open for service, the present adjuster mechanism can be observed to determine the wear condition of the brake (by the location of the adjuster mechanism along rod 36) and the brake cavity can be drained through the same access port (not shown) used for installing, and inspecting the adjuster mechanism.

Other aspects, objects and advantages of the present invention can be obtained from a study of the drawings, the disclosure and the appended claims.

What is claimed is:
1. A brake for retarding rotation of a rotatable member about a longitudinal axis, comprising:

a brake housing including a fluid receiving chamber;

a piston element disposed partially within the fluid receiving chamber, the piston element being movable by pressurized fluid in the chamber longitudinally in an extend direction outwardly with respect to the fluid receiving chamber for applying a pressure for retarding the rotation of the rotatable member;

a longitudinally extending rod mounted to the brake housing external to the piston element; and an automatic clearance adjuster mechanism including a sleeve element comprising a split sleeve and disposed about the rod, a biasing element comprising at least one retainer ring disposed around the split sleeve, the biasing element disposed for releasably holding the sleeve element against the rod for preventing movement of the sleeve element along the rod to limit the retraction of the piston element to a predetermined distance relative to the sleeve element, and a release element comprising cooperatively engageable serrated portions on the split sleeve and on the rod, the release element disposed to release the biasing element when the piston element is moved in the extend direction to allow the sleeve element to be moved by the piston element to an advanced position along the rod and allow the biasing element to hold the sleeve element against the rod in the advanced position when the movemnt in the extend direction is stopped or the piston element is moved in the opposite direction, the sleeve element when held against the rod in the advanced position limiting the retraction of the piston element to the predetermined distance to the advanced position.

2. The brake of claim 1, wherein the piston element includes a pressure plate having a longitudinal hole therethrough, and the automatic brake clearance adjuster mechanism is located in the hole.

3. The brake of claim 2, wherein the split sleeve includes first and second flanges positioned for engagement with edges of the pressure plate extending around the hole for advancing the split sleeve and limiting the retraction of the piston element, respectively.

4. The brake of claim 1, further comprising at least one spring disposed for retracting the piston element.

5. An automatic brake clearance adjuster, comprising:

a rod including a longitudinally extending external serrated portion, the rod being adapted to be fixedly mounted to a brake housing external to a fluid receiving chamber partially containing a piston element operably movable in a first longitudinal direction outwardly from the fluid receiving chamber and in an opposite second longitudinal direction into the fluid receiving chamber, the rod comprising a guide for the piston element;

a split sleeve element including a longitudinal bore and a longitudinally extending internal serrated portion in the bore, the split sleeve element cooperatively receiving the rod in the bore with the internal serrated portion located in opposed relation to the external serrated portion, a biasing element urging the serrated portions into mating engagement preventing movement of the split sleeve element in the second longitudinal direction relative to the rod, the split sleeve being disposed such that when the rod is mounted to the brake housing and the piston element is moved in the first longitudinal direction the piston element can engage the split sleeve element to move the split sleeve element to an advanced position along the rod, and the split sleeve element being positioned for engaging the piston element when moved a predetermined distance in the second longitudinal direction for preventing further movement of the piston element in the second longitudinal direction.

6. The automatic brake clearance adjuster of claim 5, wherein the biasing element comprises at least one retainer ring mounted in a groove extending around the split sleeve element.

7. The automatic brake clearance adjuster of claim 5, wherein the split sleeve element comprises a first flange engageable with the piston element when moved in the first longitudinal direction for advancing the split sleeve element with the piston element and a second flange engageable with the piston element when moved a predetermined distance in the second longitudinal direction for preventing further movement of the piston element in the second longitudinal direction.

8. The automatic brake clearance adjuster of claim 7, wherein the first flange extends around one longitudinal end of the split sleeve element and the second flange extends around an opposite longitudinal end thereof.

9. The automatic brake clearance adjuster of claim 8, wherein the split sleeve element is adapted to be received in a hole extending through a pressure plate of the piston element with the first and second flanges engageable with opposite surfaces of the pressure plate.

10. The automatic brake clearance adjuster of claim 5, wherein the brake housing comprises a cavity at least partially filled with a liquid and at least one rotor mounted for rotation through the liquid, and the piston element comprises a frictional element engageable with the rotor for opposing the rotation thereof when the piston element is urged outwardly from the fluid receiving chamber.

11. The automatic brake clearance adjuster of claim 5, wherein the brake housing includes an element resiliently urging the piston element in the second longitudinal direction.

12. The automatic brake clearance adjuster of claim 5, wherein the biasing element comprises retainer rings mounted in grooves extending around opposite ends of the split sleeve, respectively.

* * * * *